E. BUGATTI.
MEANS FOR JOURNALING THE MOTOR SHAFT IN SELF PROPELLED VEHICLES.
APPLICATION FILED JULY 1, 1914.
1,143,887.
Patented June 22, 1915.
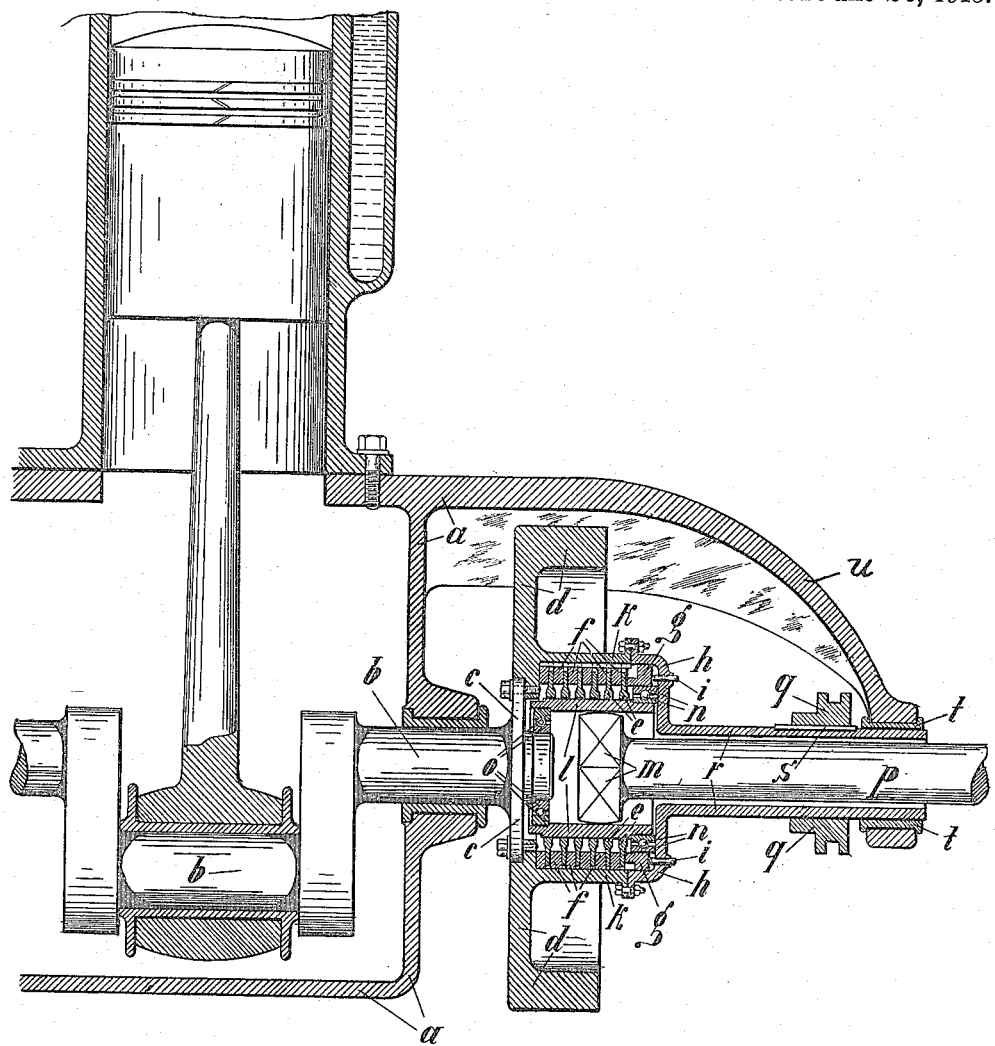

UNITED STATES PATENT OFFICE.

ETTORE BUGATTI, OF MOLSHEIM, GERMANY.

MEANS FOR JOURNALING THE MOTOR-SHAFT IN SELF-PROPELLED VEHICLES.

1,143,887.  Specification of Letters Patent.  Patented June 22, 1915.

Application filed July 1, 1914. Serial No. 848,400.

*To all whom it may concern:*

Be it known that I, ETTORE BUGATTI, a subject of the King of Italy, and residing at Molsheim, Alsace, Germany, have invented certain new and useful Improvements in Means for Journaling the Motor-Shaft in Self-Propelled Vehicles, of which the following is a specification.

The present invention has reference to improvements in the driving mechanism of self propelled vehicles, and relates more specifically to novel journal means for supporting the rear end of the crank or fly wheel shaft outside of the crank case proper.

In motor drives with a clutch, within which latter a Cardan joint is arranged, it is customary to have the rear end of the crank shaft, which carries the fly wheel, extend freely, without journal support, with the result that the shaft, under its intermittent, jerky actuation, is apt to vibrate, which in turn causes swinging and wabbling of the fly wheel and also detrimentally influences the operation of the coupled-on Cardan shaft.

The object of this invention is to do away with these disadvantages by journaling the free end of the crank or fly wheel shaft in a bearing fixed in a bracket extension of the motor casing, and I will now describe my invention in detail with reference to the accompanying drawing, which shows a sectional elevation through the essential parts, partly in side elevation.

The crank shaft $b$, suitably journaled in the engine casing or crank chamber $a$, may be provided at its rear end, outside of the crank case, with a flange $c$ and carries thereon the fly wheel $d$. This latter, in the construction shown by way of example, contains a multiple disk clutch, and for this purpose is provided with an annular clutch case $k$, which houses the clutch disks $e$, the clutch rings $f$ and the thrust annulus $g$, all of which can be acted on in well known manner by pressure bolts $i$ axially displaceable within the cover plate $h$ of the clutch case. The clutch rings $f$ are axially displaceable within the casing $k$, but are prevented from rotary displacement relatively thereto. The clutch disks are likewise axially displaceable on the internally squared housing or sleeve $l$ for the correspondingly squared crosshead $m$ of a knuckle joint, and are also prevented from rotary displacement on this housing. The knuckle joint housing $l$ is centrally journaled within the clutch casing $k$ by means of ball bearings $n$, $o$, of which the latter is supported on the projecting free end of the crank shaft. The clutch disks $e$ are connected to the sleeve $l$ by means of feathers or the like, so that they take the sleeve along, thereby transmitting the torque of the crank shaft to the driven Cardan shaft $p$. This latter is floatingly suspended within the hollow axle $r$ by the knuckle joint crosshead, and the hollow axle is rigidly secured to the fly wheel clutch casing and supports the sliding muff or collar $q$, which latter can be axially shifted thereon along the feather $s$ and is actuated in well known manner by a pedal or hand lever gear for actuating the clutch. The hollow axle $r$ at its free end is journaled in the end bearing $t$, fixed in the bracket extension $u$ of the engine casing. It is obvious that by this means the hollow axle, which forms the axial extension of the crank shaft with its fly wheel and clutch, will run absolutely true, so that the direction of the knuckle joint driven shaft $p$ is, to a certain extent, independent of the crank shaft $b$ and fly wheel hollow axle $r$, with the result that the actuating mechanism of the clutch will be subjected to not nearly as much wear during non-use as in the prior constructions with unsupported fly wheel shaft end.

What I claim is:

1. In self-propelled vehicles, in combination with the engine casing and a crank shaft journaled therein, a fly wheel on the free end of said crank shaft, a clutch within said fly wheel, a knuckle joint within said clutch, the driven shaft member of said knuckle joint extending coaxially with said crank shaft, a hollow axle extending from said fly wheel and loosely surrounding said driven member, and means for journaling the free end of said hollow axle.

2. In self-propelled vehicles, in combination with the engine casing and a crank shaft journaled therein, a fly wheel on the free end of said crank shaft, a clutch within said fly wheel, a knuckle joint within said clutch comprising a driving and a driven member, a hollow axle coaxially extending from said fly wheel and loosely surrounding said driven member, and a bracket member extending from said engine casing and adapted to journal the free end of said hollow axle.

3. In self-propelled vehicles, in combination with the engine casing and a crank shaft journaled therein, a fly wheel on the free, protruding end of said crank shaft, a clutch within said fly wheel, a knuckle joint within said clutch comprising a driving and a driven member, a hollow axle coaxially extending from said fly wheel and loosely surrounding said driven member, and a bracket member extending in the rear of said engine casing, partly covering-in said clutch fly wheel and adjacent parts and journaling the free end of said hollow axle.

4. In self-propelled vehicles, in combination with the crank casing and a crank shaft journaled therein, a fly wheel on the end of the said crank shaft protruding from said casing, a multiple disk clutch within said fly wheel, a Cardan joint within said clutch, the driven Cardan shaft of said joint extending in alinement with said crank shaft, a hollow axle rigidly secured to said clutch fly wheel also in alinement with said crank shaft, said Cardan shaft floating in said hollow axle, and a bracket member extending from said crank case and adapted to journal the free end of said hollow axle.

In testimony whereof I affix my signature in presence of two witnesses.

ETTORE BUGATTI.

Witnesses:
 JOSEPH ROHME,
 JACOB W. SCHMIDT.

Copies of this patent may be obtained for five cents each, by addressing the "Commissioner of Patents, Washington, D. C."